(12) United States Patent
Ma et al.

(10) Patent No.: US 12,542,767 B2
(45) Date of Patent: Feb. 3, 2026

(54) NETWORK COMMUNICATION SYSTEM, NETWORK COMMUNICATION METHOD, AND COMPUTER-PRODUCT

(71) Applicant: BOE Technology Group Co., Ltd., Beijing (CN)

(72) Inventors: Xitong Ma, Beijing (CN); Youxiang Xia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 191 days.

(21) Appl. No.: 18/687,293

(22) PCT Filed: Jan. 11, 2023

(86) PCT No.: PCT/CN2023/071793
§ 371 (c)(1),
(2) Date: Feb. 27, 2024

(87) PCT Pub. No.: WO2024/148535
PCT Pub. Date: Jul. 18, 2024

(65) Prior Publication Data
US 2025/0247372 A1    Jul. 31, 2025

(51) Int. Cl.
*H04L 9/40* (2022.01)
*G06K 7/14* (2006.01)
(52) U.S. Cl.
CPC ........ *H04L 63/0428* (2013.01); *G06K 7/1417* (2013.01)
(58) Field of Classification Search
CPC ... G09C 5/00; H04L 63/0428; H04L 63/0435; H04L 9/3231; H04L 9/0819; H04W 12/77; G06F 21/6209; G06K 7/1417

USPC .......................................................... 713/160
See application file for complete search history.

(56) References Cited

U.S. PATENT DOCUMENTS

| | | | | |
|---|---|---|---|---|
| 6,978,378 B1 * | 12/2005 | Koretz | ................ | H04L 63/0428 713/193 |
| 7,617,392 B2 * | 11/2009 | Hair | ........................ | G06F 21/10 713/153 |
| 8,261,059 B2 * | 9/2012 | Bryan | ................ | H04L 63/0428 713/153 |
| 11,838,330 B2 * | 12/2023 | Amro | ................... | H04L 63/1408 |

(Continued)

FOREIGN PATENT DOCUMENTS

| | | |
|---|---|---|
| CN | 103179086 A | 6/2013 |
| CN | 103763572 A | 4/2014 |

(Continued)

OTHER PUBLICATIONS

International Search Report & Written Opinion mailed Apr. 21, 2023, regarding PCT/CN2023/071793.

*Primary Examiner* — Amare F Tabor
(74) *Attorney, Agent, or Firm* — Intellectual Valley Law, P.C.

(57) ABSTRACT

A network communication system is provided. The network communication system includes a server; a host terminal device connected to the server through a network; and a client terminal device connected to the server through a network. The host terminal device is configured to transfer, directly or indirectly, an encrypted file to the server. The server is configured to store the encrypted file. The server is configured to transmit the encrypted file to the client terminal device.

18 Claims, 10 Drawing Sheets

(56) References Cited

U.S. PATENT DOCUMENTS

| | | | | |
|---|---|---|---|---|
| 2006/0129627 A1* | 6/2006 | Phillips | ................... | H04L 63/10 |
| | | | | 709/200 |
| 2015/0326517 A1* | 11/2015 | Block | ................. | H04L 63/0807 |
| | | | | 709/206 |
| 2019/0392407 A1* | 12/2019 | Keskar | ................. | G06Q 20/363 |

FOREIGN PATENT DOCUMENTS

| | | | |
|---|---|---|---|
| CN | 104506793 | A | 4/2015 |
| CN | 111953642 | A | 11/2020 |
| CN | 112653868 | A | 4/2021 |
| CN | 112655037 | A | 4/2021 |
| CN | 113792229 | A | 12/2021 |
| WO | 2015035795 | A1 | 3/2015 |
| WO | 2019223441 | A1 | 11/2019 |

\* cited by examiner

NETWORK COMMUNICATION SYSTEM, NETWORK COMMUNICATION METHOD, AND COMPUTER-PRODUCT

CROSS-REFERENCE TO RELATED APPLICATION

This application is a national stage application under 35 U.S.C. § 371 of International Application No. PCT/CN2023/071793, filed Jan. 11, 2023, the contents of which are incorporated by reference in the entirety.

TECHNICAL FIELD

The present invention relates to network communication technology, more particularly, to a network communication system, a network communication method, and a computer-product.

BACKGROUND

Related network conference systems are prone to security breaches. In related network conference systems, typically unencrypted files are transferred between a host terminal device and a client terminal device through a network.

SUMMARY

In one aspect, the present disclosure provides a network communication system, comprising a server; a host terminal device connected to the server through a network; and a client terminal device connected to the server through a network; wherein the host terminal device is configured to transfer, directly or indirectly, an encrypted file to the server; the server is configured to store the encrypted file; and the server is configured to transmit the encrypted file to the client terminal device.

Optionally, the host terminal device is configured to generate a first two-dimensional bar code; upon scanning the first two-dimensional bar code, the client terminal device is configured to parse the first two-dimensional bar code to obtain a first uniform resource locator; and upon parsing the first two-dimensional bar code, the client terminal device is configured to transfer a file to the host terminal device via the first uniform resource locator.

Optionally, the client terminal device is configured to parse the first two-dimensional bar code to further obtain a first component of the first two-dimensional bar code; a first value of the first component indicates that an encrypted file transfer is not requested; and a second value of the first component indicates that an encrypted file transfer is requested.

Optionally, the client terminal device is configured to parse the first two-dimensional bar code to obtain an encryption key; encrypt a first file to obtain an encrypted first file; and transfer the encrypted first file to the host terminal device.

Optionally, when an encrypted file transfer is requested, the client terminal device is configured to parse the first two-dimensional bar code to obtain a secondary encryption key; generate an encryption-decryption key by applying an encryption-decryption key generating algorithm on the secondary encryption key; and encrypt the first file using the encryption-decryption key to obtain the encrypted first file.

Optionally, when an encrypted file transfer is not requested, the client terminal device is configured to transfer a first file to the host terminal device without encryption.

Optionally, the host terminal device is configured to receive an encrypted first file from the client terminal device; and decrypt the encrypted first file using a decryption key.

Optionally, the host terminal device is configured to generate a second two-dimensional bar code; upon obtaining the second two-dimensional bar code from the host terminal device, the client terminal device is configured to parse the second two-dimensional bar code to obtain a second uniform resource locator; and upon parsing the second two-dimensional bar code, the client terminal device is configured to download a file from the server via the second uniform resource locator.

Optionally, the client terminal device is configured to parse the second two-dimensional bar code to further obtain a first component of the second two-dimensional bar code; a first value of the first component indicates that an encrypted file transfer is not requested; and a second value of the first component indicates that an encrypted file transfer is requested.

Optionally, the client terminal device is configured to download an encrypted second file from the server; parse the second two-dimensional bar code to obtain a decryption key; and decrypt the encrypted second file to obtain a second file.

Optionally, when an encrypted file transfer is requested, the client terminal device is configured to generate an encryption-decryption key by applying an encryption-decryption key generating algorithm on the decryption key; and decrypt the encrypted second file using the encryption-decryption key to obtain a second file.

Optionally, the network communication system further comprises an authentication device locally connected to the host terminal device; wherein the host terminal device is configured to transfer a file to the authentication device; the authentication device is configured to encrypt the file to generate an encrypted file; the authentication device is further configured to transfer the encrypted file to the host terminal device; the host terminal device is further configured to transfer the encrypted file to the server; and the server is configured to transfer the encrypted file to the client terminal device.

Optionally, the authentication device is configured to generate a file encryption key, and configured to encrypt the file transferred by the host terminal device using the file encryption key into the encrypted file.

Optionally, the authentication device is configured to generate a file decryption key; generate an encrypted file decryption key by encrypting the file decryption key; and transfer the encrypted file decryption key to the host terminal device; wherein the host terminal device is further configured to transfer the encrypted file decryption key to the server; and the server is configured to transfer the encrypted file decryption key to the client terminal device.

Optionally, the file decryption key is the same as a file encryption key used by the authentication device to encrypt the file.

Optionally, the client terminal device is configured to obtain the encrypted file and an encrypted file decryption key from the server; decrypt the encrypted file decryption key to generate a file decryption key; and decrypt the encrypted file using the file decryption key to obtain the file.

Optionally, the network communication system further comprises a biometric feature collector configured to collect biometric feature data of a user; and transmit the biometric feature data of the user to the host terminal device; wherein the host terminal device is configured to transfer biometric feature of the user to the authentication device; the authentication device is configured to perform biometric feature recognition upon receiving the biometric feature of the user; the server is configured to transmit a list of users to the host terminal device; and the host terminal device is configured to compare biometric feature recognition result with the list of users.

Optionally, the host terminal device is configured to extract biometric feature from the biometric feature data transmitted from the biometric feature collector; wherein the authentication device is configured to store an encrypted biometric feature database including encrypted biometric features of a plurality of users, and configured to store encrypted user information; decrypt the encrypted biometric features of the plurality of users stored in the encrypted biometric feature database, to generate a biometric feature database including unencrypted biometric features of the plurality of users; decrypt the encrypted user information, to generate user information; and compare the biometric feature extracted by the host terminal device and transmitted to the authentication device with the biometric features of the plurality of users unencrypted by the authentication device, thereby determining an identity of the user; wherein the host terminal device is configured to compare the identity of the user with identities of users in the list of users transmitted from the server to the host terminal device.

In another aspect, the present disclosure provides a network communication method, comprising connecting a host terminal device to a server through a network; connecting a client terminal device to the server through a network; transferring, directly or indirectly, an encrypted file from the host terminal device to the server; storing the encrypted file on the server; and transmitting the encrypted file from the server to the client terminal device.

In another aspect, the present disclosure provides a computer-product comprising a non-transitory tangible computer-readable medium having computer-readable instructions thereon, the computer-readable instructions being executable by a processor to cause the processor to perform connecting a host terminal device to a server through a network; connecting a client terminal device to the server through a network; transferring, directly or indirectly, an encrypted file from the host terminal device to the server; storing the encrypted file on the server; and transmitting the encrypted file from the server to the client terminal device.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a network communication system, a network communication method, and a computer-product that substantially obviate one or more of the problems due to limitations and disadvantages of the related art. In one aspect, the present disclosure provides a network communication system. In some embodiments, the network communication system includes a server; a host terminal device connected to the server through a network; and a client terminal device connected to the server through a network. Optionally, the host terminal device is configured to transfer, directly or indirectly, an encrypted file to the server. Optionally, the server is configured to store the encrypted file. Optionally, the server is configured to transmit the encrypted file to the client terminal device.

Figure 1:
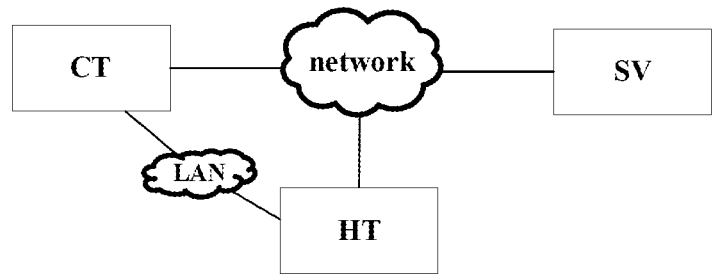
FIG. 1 is a schematic diagram illustrating an implementation of a network communication system in some embodiments according to the present disclosure.

FIG. 1 is a schematic diagram illustrating an implementation of a network communication system in some embodiments according to the present disclosure. Referring to FIG. 1, the network conference system in some embodiments includes a host terminal device HT, a client terminal device CT, and a server SV, the host terminal device HT being connected to the server SV through a network, the client terminal device CT being connect to the server SV through the network, for example, through a Local Area Network (LAN) or a Wide Area Network (WAN). Optionally, the server SV is a server in the cloud. In one example, the cloud is a public cloud. In another example, the cloud is a private cloud. In another example, the cloud is a hybrid cloud. Optionally, the client terminal device CT is connected to the host terminal device HT through a local area network (depicted as LAN in FIG. 1).

Figure 2:
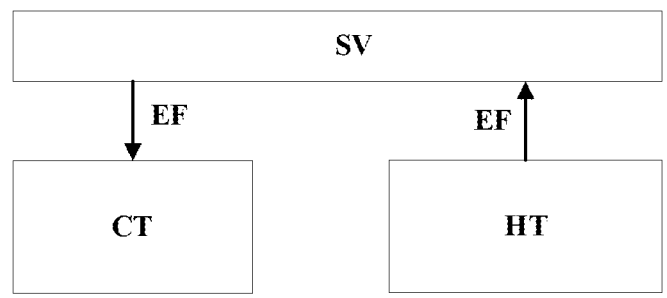
FIG. 2 illustrates a network communication system in some embodiments according to the present disclosure.

FIG. 2 illustrates a network communication system in some embodiments according to the present disclosure. Referring to FIG. 2, the host terminal device HT in some embodiments is configured to transfer, directly or indirectly, an encrypted file EF to the server SV. The server SV is configured to store the encrypted file EF. In some embodiments, the server SV is configured to transmit the encrypted file EF to the client terminal device CT. Optionally, the host terminal device HT in some embodiments is further configured to transfer, directly or indirectly, a decryption key to the server SV.

Figure 3:
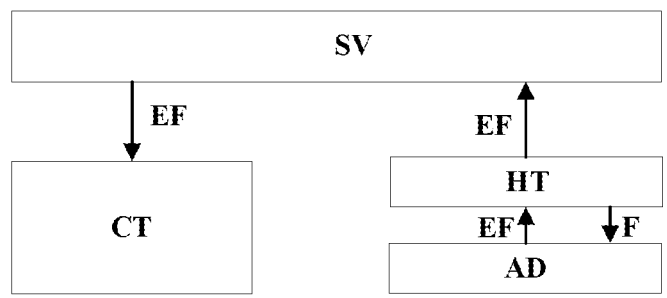
FIG. 3 illustrates a network communication system in some embodiments according to the present disclosure.

FIG. 3 illustrates a network communication system in some embodiments according to the present disclosure. FIG. 3 illustrates an embodiment in which the host terminal device HT is configured to indirectly transfer an encrypted file EF to the server SV. Referring to FIG. 3, the network communication system in some embodiments further includes an authentication device AD. The host terminal device HT is configured to transfer a file F to the authentication device AD, and the authentication device AD is configured to encrypt the file F to generate an encrypted file EF. The authentication device AD is further configured to transfer the encrypted file EF to the host terminal device HT. The host terminal device HT is configured to transfer the encrypted file EF to the server SV. Optionally, the authentication device AD is further configured to transfer a decryption key to the host terminal device HT, and the host terminal device HT is further configured to transfer the decryption key to the server SV.

Figure 4:
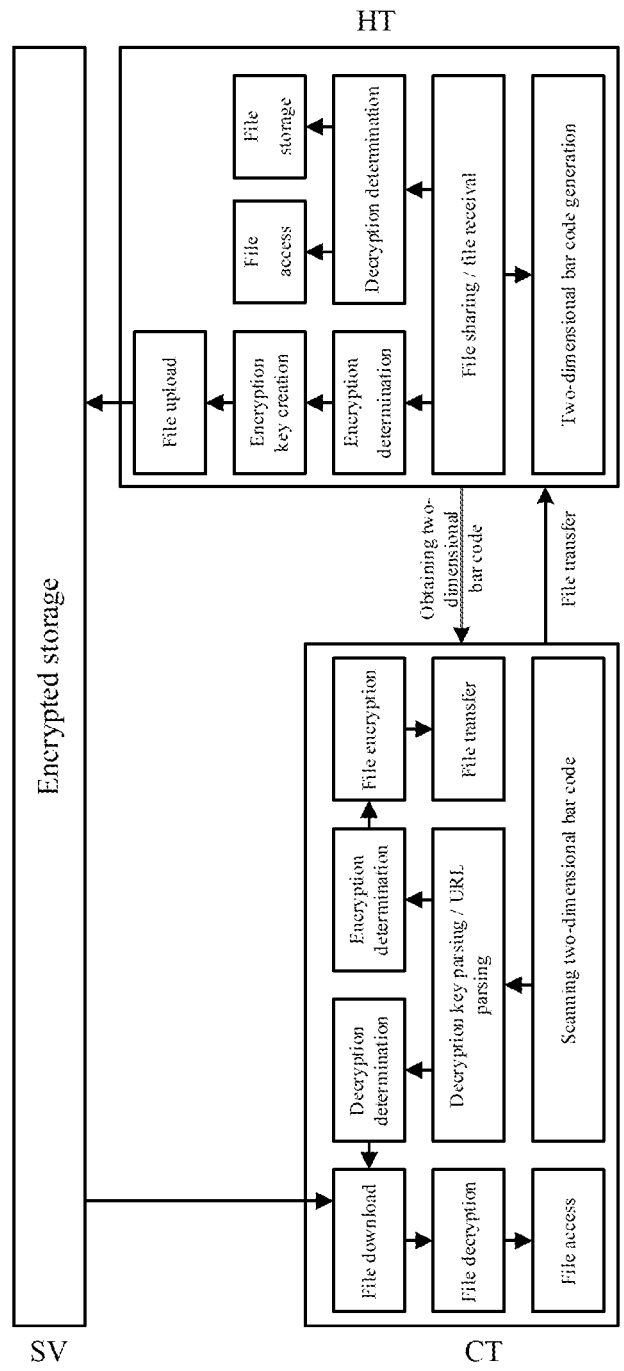
FIG. 4 illustrates a network communication system in some embodiments according to the present disclosure.

FIG. 4 illustrates a network communication system in some embodiments according to the present disclosure. Referring to FIG. 4, the network conference system in some embodiments includes a host terminal device HT, a client terminal device CT, and a server SV. In some embodiments, the client terminal device CT is configured to transfer a first file to the host terminal device HT. Optionally, the client terminal device CT is connected to the host terminal device HT through a Local Area Network.

In some embodiments, to transfer the first file from the client terminal device CT to the host terminal device HT, the host terminal device HT is configured to receive a user input on whether or not an encrypted file transfer is requested, and configured to generate a two-dimensional bar code. The client terminal device CT is configured to parse the two-dimensional bar code, and obtain a uniform resource locator and optionally an encryption key. The client terminal device CT is configured to encrypt the first file and transfer an encrypted first file to the host terminal device HT using the uniform resource locator. Upon receiving the encrypted first file transferred from the client terminal device CT, the host terminal device HT is configured to decrypt the encrypted first file, allowing user access. Further, the host terminal device HT is configured to save the encrypted first file.

Figure 5A:
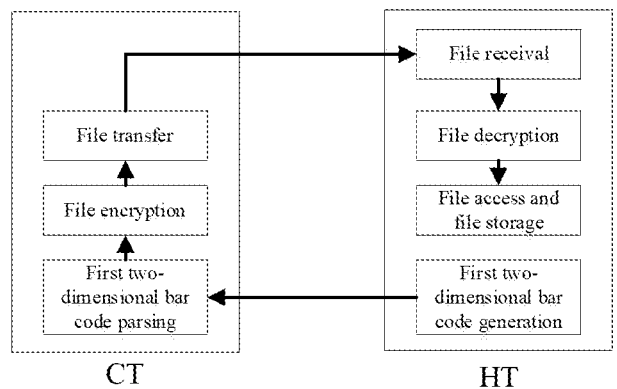
FIG. 5A illustrates a process of file transfer from a client terminal device to a host terminal device in a network communication system in some embodiments according to the present disclosure.
Figure 5B:
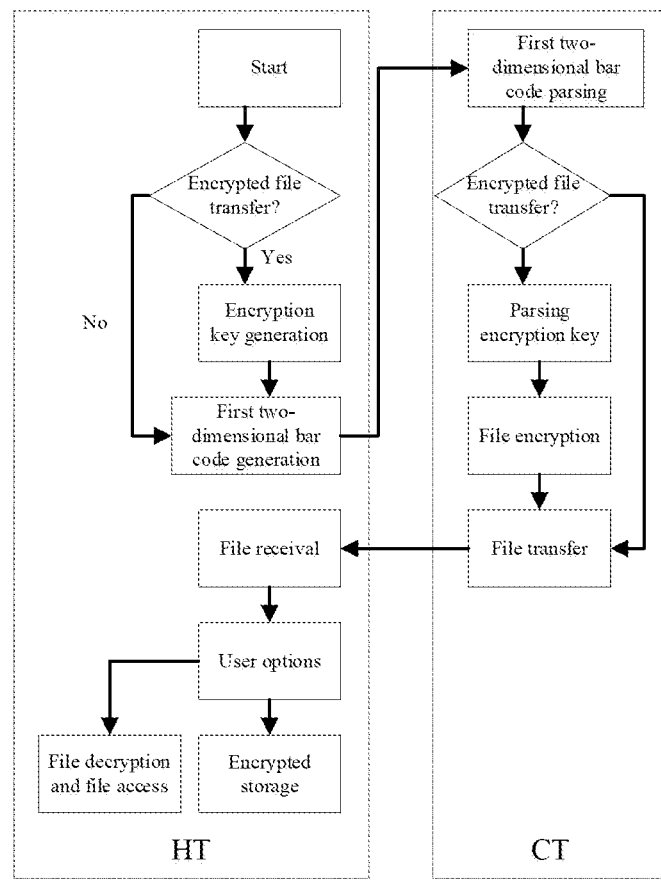
FIG. 5B illustrates a detailed process of file transfer from a client terminal device to a host terminal device in a network communication system in some embodiments according to the present disclosure.

FIG. 5A illustrates a process of file transfer from a client terminal device to a host terminal device in a network communication system in some embodiments according to the present disclosure. FIG. 5B illustrates a detailed process of file transfer from a client terminal device to a host terminal device in a network communication system in some embodiments according to the present disclosure. Referring to FIG. 4, FIG. 5A, and FIG. 5B, the host terminal device HT is configured to generate a first two-dimensional bar code ("First two-dimensional bar code generation"). In some embodiments, the host terminal device HT is further configured to receive a user input on whether or not an encrypted file transfer is requested. Depending on the user input on whether or not the encrypted file transfer is requested, the host terminal device HT is configured to generate different types of first two-dimensional bar codes.

In some embodiments, the first two-dimensional bar code includes a first component C1, a second component C2, and a third component C3. The first component C1 indicates whether an encrypted file transfer is requested. In one example, the first component C1 has a bit width of one bit. In another example, a value 0 for the first component C1 indicates that the encrypted file transfer is not requested. In another example, a value 1 for the first component C1 indicates that the encrypted file transfer is requested.

In some embodiments, the second component C2 includes an encryption key (e.g., a secondary encryption key). Optionally, when the encrypted file transfer is not requested, the second component C2 has invalid bits, indicating that a non-encrypted file transfer is requested. Optionally, when the encrypted file transfer is requested, the second component C2 includes an encryption key (e.g., a secondary encryption key). In one example, the second component C2 has a bit width of 128 bits. In another example, when the first component C1 has a value of 0, the second component C2 has 128 bits of 0, indicating that a non-encrypted file transfer is requested. In another example, when the first component C1 has a value of 1, the second component C2 includes an encryption key of 128 bits (e.g., a secondary encryption key of 128 bits).

In some embodiments, prior to generating the first two-dimensional bar code, the host terminal device HT is further configured to generate an encryption-decryption key (e.g., denoted as K0). Optionally, the host terminal device HT includes a secure cryptoprocessor configured to generate the encryption-decryption key. Optionally, the host terminal device HT is further configured to generate a secondary encryption key (e.g., denoted as K1) using a secondary encryption key generating algorithm (e.g., a self-defined algorithm). Various appropriate secondary encryption key generating algorithms may be used for generating the secondary encryption key from the encryption-decryption key. In one example, the secondary encryption key is generated from the encryption-decryption key by a bit operation. In another example, the bit operation is a circular shift N bits operation, N being a positive integer equal to or great than 1. In another example, the bit operation is a circular shift left N bits operation. In another example, the bit operation is a circular shift right N bits operation.

In some embodiments, the third component C3 includes a first uniform resource locator (URL) for transferring the first file.

Referring to FIG. 4, FIG. 5A, and FIG. 5B, upon scanning the first two-dimensional bar code by the client terminal device CT, the client terminal device CT is configured to parse the first two-dimensional bar code ("First two-dimensional bar code parsing"). In some embodiments, the client terminal device CT is configured to obtain the encryption key by parsing the first two-dimensional bar code. Optionally, the client terminal device CT is configured to obtain a secondary encryption key by parsing the first two-dimensional bar code. Optionally, the client terminal device CT is further configured to generate an encryption-decryption key by applying an encryption-decryption key generating algorithm on the secondary encryption key. The encryption-decryption key generating algorithm in some embodiments includes an inverse operation of the secondary encryption key generating algorithm. For example, when the bit operation for the secondary encryption key generating algorithm is a circular shift left N bits operation, a bit operation for the encryption-decryption key generating algorithm is a circular shift right N bits operation.

In some embodiments, the client terminal device CT is configured to obtain the first component C1 of the first two-dimensional bar code by parsing the first two-dimensional bar code.

In some embodiments, the client terminal device CT is configured to obtain the first uniform resource locator for transferring the first file by parsing the first two-dimensional bar code.

Referring to FIG. 4, FIG. 5A, and FIG. 5B, the client terminal device CT is configured to transfer the first file to the host terminal device HT using the first uniform resource locator. Optionally, when a value (e.g., a value of 0) for the first component C1 indicates that the encrypted file transfer is not requested, the client terminal device CT is configured to transfer the first file to the host terminal device HT using the first uniform resource locator directly without encryption. Optionally, when a value (e.g., a value of 1) for the first component C1 indicates that the encrypted file transfer is requested, the client terminal device CT is configured to encrypt the first file using an encryption key to obtain an encrypted first file ("File encryption"), and configured to transfer the encrypted first file to the host terminal device HT using the first uniform resource locator ("File transfer"). Optionally, the client terminal device CT is configured to encrypt the first file using the encryption-decryption key discussed above. Further, the encryption may be performed using various appropriate algorithms. In one example, the encryption may be performed using a symmetric advanced encryption standard algorithm, e.g., with a key size of 128 bits (AES-128).

Referring to FIG. 4, FIG. 5A, and FIG. 5B, the host terminal device HT is configured to receive the first file (not encrypted) or the encrypted first file from the client terminal device CT ("File receival"). In some embodiments, the host terminal device HT is configured to determine whether a received file is encrypted ("Decryption determination"). Upon determination the received file is encrypted, the host terminal device HT is further configured to decrypt the received file using a decryption key, e.g., the encryption-decryption key discussed above. Once the received file is decrypted, a user may access the decrypted file. In some embodiments, the host terminal device HT is further configured to save the file ("File storage"), e.g., in an encrypted form.

Figure 6A:
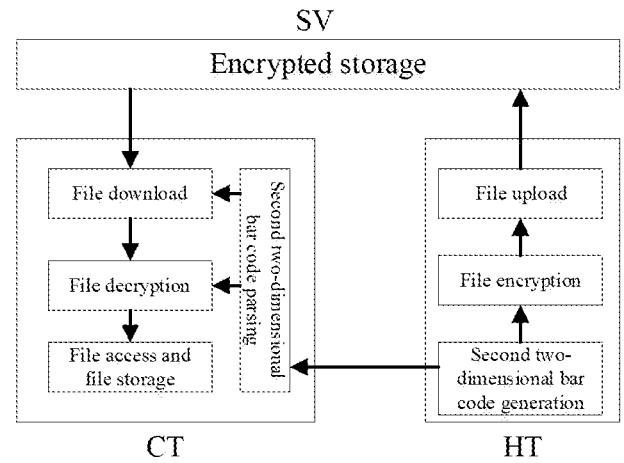
FIG. 6A illustrates a process of obtaining a file from a host terminal device in a network communication system in some embodiments according to the present disclosure.
Figure 6B:
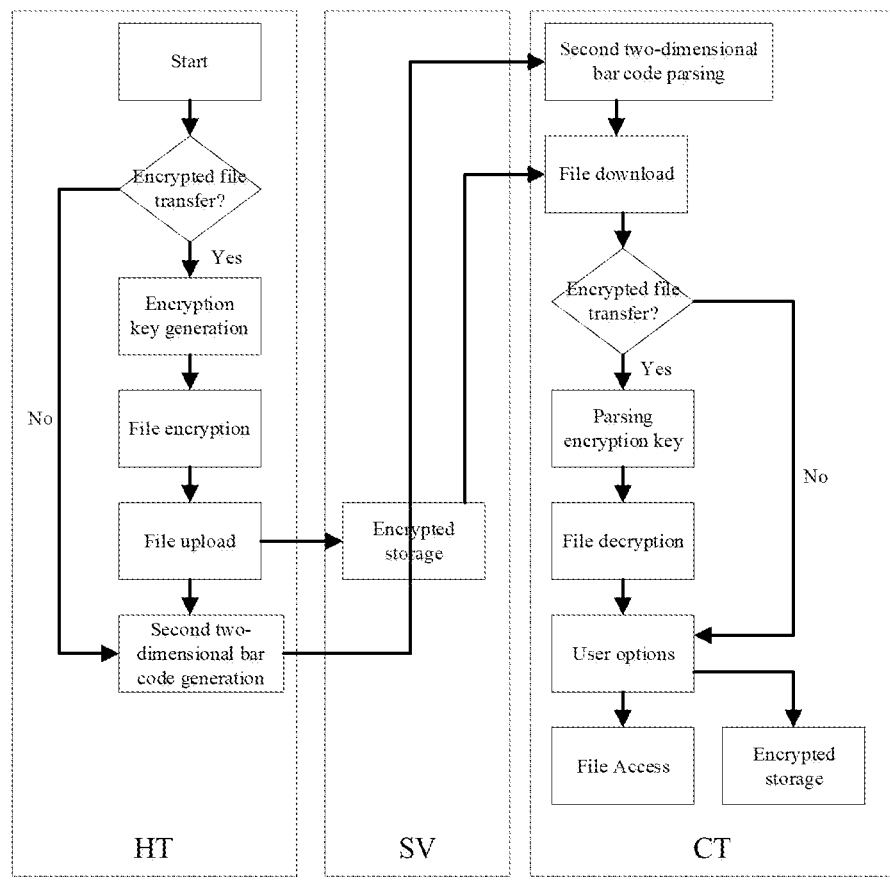
FIG. 6B illustrates a process of obtaining a file from a host terminal device in a network communication system in some embodiments according to the present disclosure.

FIG. 6A illustrates a process of obtaining a file from a host terminal device in a network communication system in some embodiments according to the present disclosure. FIG. 6B illustrates a process of obtaining a file from a host terminal device in a network communication system in some embodiments according to the present disclosure. In the present disclosure, the client terminal device CT does not download a file directly from the host terminal device HT. In the present disclosure, upon receiving a request from a client terminal device CT for a second file, the host terminal device HT is configured to upload the second file to the server SV, allowing the client terminal device CT to download the second file from the server SV. The host terminal device HT is configured to generate a second two-dimensional bar code. In some embodiments, the host terminal device HT is further configured to receive a user input on whether or not an encrypted file transfer is requested. Depending on the user input on whether or not the encrypted file transfer is requested, the host terminal device HT is configured to generate different types of second two-dimensional bar codes. Upon uploading the second file to the server SV, the server SV is configured to save an encrypted second file. The client terminal device CT is configured to parse the second two-dimensional bar code to obtain a decryption key, download the encrypted second file from the server SV, and decrypt the encrypted second file, allowing file access and file storage on the client terminal device CT. By having the server SV as the intermediate in the file transfer path, the security of the file transfer and file storage can be significantly improved.

Referring to FIG. 4, FIG. 6A, and FIG. 6B, the host terminal device HT is configured to generate a second two-dimensional bar code ("Second two-dimensional bar code generation"). In some embodiments, the host terminal device HT is further configured to receive a user input (e.g., transmitted from the client terminal device CT and received by the host terminal device HT) on whether or not an encrypted file transfer is requested. Depending on the user input on whether or not the encrypted file transfer is requested, the host terminal device HT is configured to generate different types of second two-dimensional bar codes.

In some embodiments, the second two-dimensional bar code includes a first component C1, a second component C2, and a third component C3. The first component C1 indicates whether an encrypted file transfer is requested. In one example, the first component C1 has a bit width of one bit. In another example, a value 0 for the first component C1 indicates that the encrypted file transfer is not requested. In another example, a value 1 for the first component C1 indicates that the encrypted file transfer is requested.

In some embodiments, the second component C2 includes an encryption key (e.g., a secondary encryption key). Optionally, when the encrypted file transfer is not requested, the second component C2 has invalid bits, indicating that a non-encrypted file transfer is requested. Optionally, when the encrypted file transfer is requested, the second component C2 includes an encryption key (e.g., a secondary encryption key). In one example, the second component C2 has a bit width of 128 bits. In another example, when the first component C1 has a value of 0, the second component C2 has 128 bits of 0, indicating that a non-encrypted file transfer is requested. In another example, when the first component C1 has a value of 1, the second component C2 includes an encryption key of 128 bits (e.g., a secondary encryption key of 128 bits).

In some embodiments, prior to generating the second two-dimensional bar code, the host terminal device HT is further configured to generate an encryption-decryption key (e.g., denoted as K0). Optionally, the host terminal device HT includes a secure cryptoprocessor configured to generate the encryption-decryption key. Optionally, the host terminal device HT is further configured to generate a secondary encryption key (e.g., denoted as K1) using a secondary encryption key generating algorithm (e.g., a self-defined algorithm). Various appropriate secondary encryption key generating algorithms may be used for generating the secondary encryption key from the encryption-decryption key. In one example, the secondary encryption key is generated from the encryption-decryption key by a bit operation. In another example, the bit operation is a circular shift N bits operation, N being a positive integer equal to or great than 1. In another example, the bit operation is a circular shift left N bits operation. In another example, the bit operation is a circular shift right N bits operation.

In some embodiments, the third component C3 includes a second uniform resource locator for downloading the second file or the encrypted second file.

In some embodiments, the host terminal device HT is configured to transfer the encrypted second file to the server SV, and the server SV is configured to save the encrypted second file.

Referring to FIG. 4, FIG. 6A, and FIG. 6B, upon obtaining the second two-dimensional bar code by the client terminal device CT from the host terminal device, the client terminal device CT is configured to parse the second two-dimensional bar code ("Second two-dimensional bar code parsing"). In some embodiments, the client terminal device CT is configured to obtain the decryption key by parsing the second two-dimensional bar code. Optionally, the client terminal device CT is configured to obtain a decryption key by parsing the second two-dimensional bar code. Optionally, the client terminal device CT is further configured to generate an encryption-decryption key by applying an encryption-decryption key generating algorithm on the decryption key. The encryption-decryption key generating algorithm in some embodiments includes an inverse operation of the secondary encryption key generating algorithm. For example, when the bit operation for the secondary encryption key generating algorithm is a circular shift left N bits operation, a bit operation for the encryption-decryption key generating algorithm is a circular shift right N bits operation.

In some embodiments, the client terminal device CT is configured to obtain the first component C1 of the second two-dimensional bar code by parsing the second two-dimensional bar code.

In some embodiments, the client terminal device CT is configured to obtain the second uniform resource locator for downloading the second file or the encrypted second file by parsing the second two-dimensional bar code.

Referring to FIG. 4, FIG. 6A, and FIG. 6B, the client terminal device CT is configured to download the second file or the encrypted second file from the server SV using the second uniform resource locator. Optionally, when a value (e.g., a value of 0) for the first component C1 indicates that the encrypted file transfer is not requested, the server SV is configured to transfer the second file to the client terminal device CT using the second uniform resource locator directly without encryption. Optionally, when a value (e.g., a value of 1) for the first component C1 indicates that the encrypted file transfer is requested, the server SV is configured to transfer the encrypted second file to the client terminal device CT ("File download"). Optionally, the client terminal device CT is configured to decrypt the encrypted second file using the encryption-decryption key discussed above ("File decryption"). Further, the decryption may be performed using various appropriate algorithms. In one example, the decryption may be performed using a symmetric advanced encryption standard algorithm, e.g., with a key size of 128 bits (AES-128).

Figure 7:
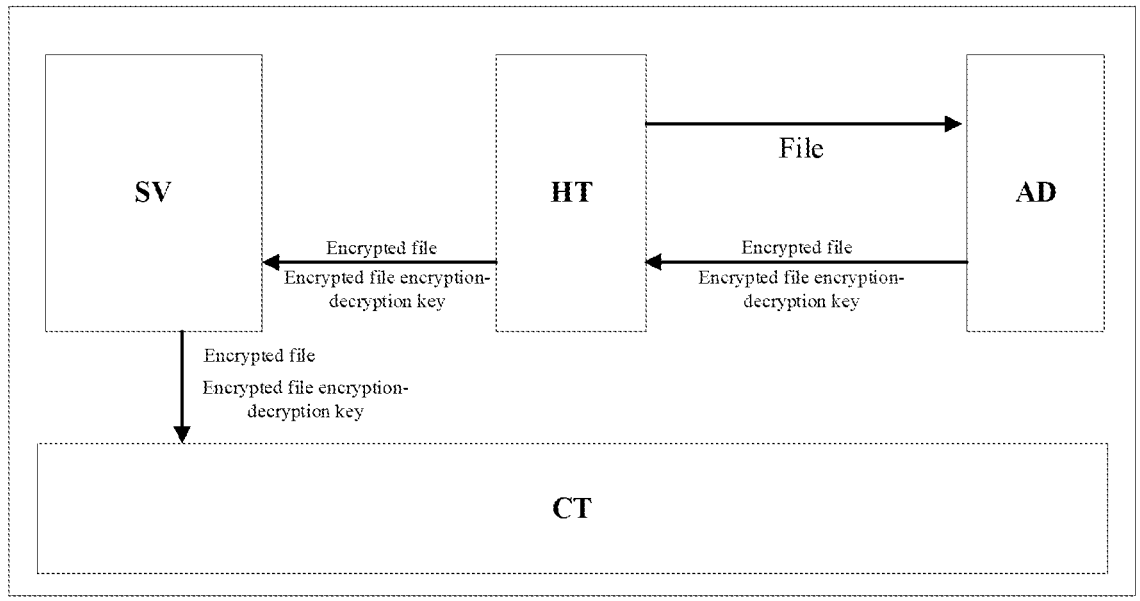
FIG. 7 illustrates a network communication system in some embodiments according to the present disclosure.

FIG. 7 illustrates a network communication system in some embodiments according to the present disclosure. Referring to FIG. 7, the network communication system in some embodiments includes a host terminal device HT, a client terminal device CT, a server SV, and an authentication device AD. The host terminal device HT is configured to transfer a file (e.g., an unencrypted conference document) to the authentication device AD, and the authentication device AD is configured to encrypt the file to generate an encrypted file. The authentication device AD is further configured to generate a file decryption key (e.g., an encrypted file encryption-decryption key). The authentication device AD is further configured to transfer the encrypted file and the decryption key (e.g., the encrypted file encryption-decryption key) to the host terminal device HT.

In some embodiments, the host terminal device HT is further configured to transfer the encrypted file and the decryption key (e.g., the encrypted file encryption-decryption key) to the server SV. The server SV is configured to transfer the encrypted file and the decryption key (e.g., the encrypted file encryption-decryption key) to the client terminal device CT.

In some embodiments, the authentication device AD is a physical device that is locally connected to the host terminal device HT. In one example, the authentication device AD is connected to the host terminal device HT through a port, e.g., a USB port. The inventors of the present disclosure discover that, by having an authentication device AD, any sensitive information (including files, encryption keys, decryption keys) is stored, processed, and managed in the authentication device AD which is provided locally, and is not exposed to risk of hacking during network transmission. Any information transmitted through the network is encrypted. By having the authentication device AD, the security of the file transfer and file storage can be significantly improved.

Figure 8:
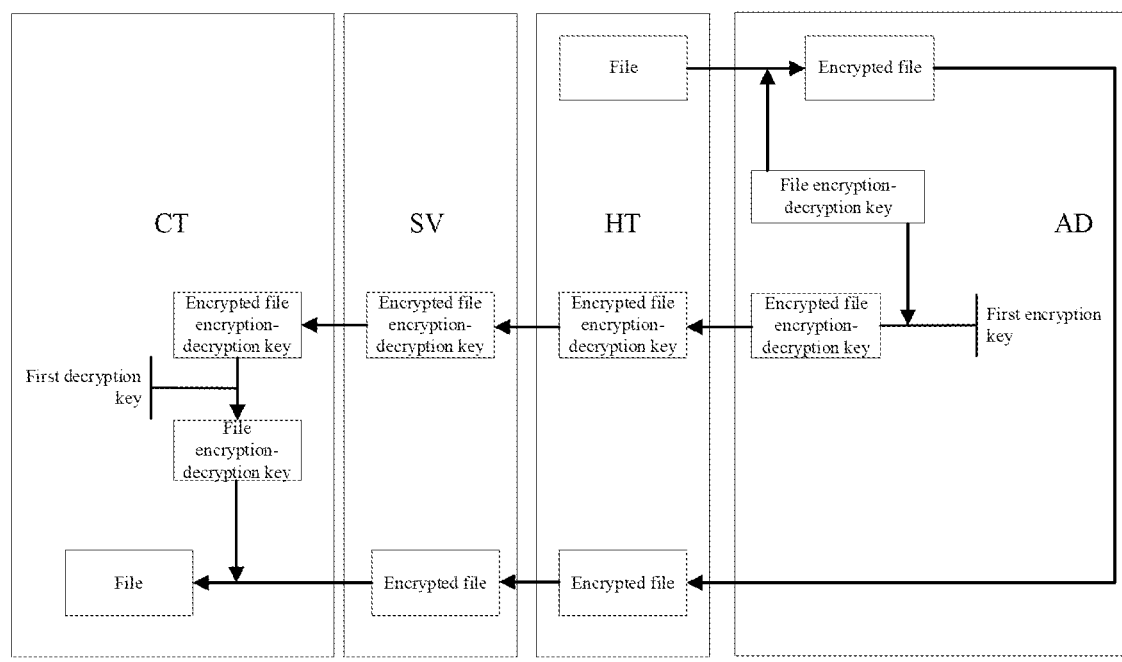
FIG. 8 illustrates a detailed process of file transfer from a host terminal device to a client terminal device in a network communication system in some embodiments according to the present disclosure.

FIG. 8 illustrates a detailed process of file transfer from a host terminal device to a client terminal device in a network communication system in some embodiments according to the present disclosure. Referring to FIG. 7 and FIG. 8, the host terminal device HT is configured to transfer a file to the authentication device AD. The authentication device AD is configured so that any unencrypted information can be written onto the authentication device AD, but any unencrypted information on the authentication device AD cannot be read out. The file transferred by the host terminal device HT may be a conference file (e.g., a meeting minutes of a conference). The file transferred by the host terminal device HT may be an unencrypted file.

In some embodiments, the authentication device AD is configured to generate a file encryption key (e.g., the file encryption-decryption key denoted in FIG. 8). The authentication device AD is further configured to encrypt the file transferred by the host terminal device HT using the file encryption key into an encrypted file. Optionally, the authentication device AD is configured to encrypt the file using a symmetric encryption algorithm. As shown in FIG. 8, the authentication device AD is configured to transfer the encrypted file to the host terminal device HT, and the host terminal device HT is configured to transfer the encrypted file to the server SV.

In some embodiments, the authentication device AD is further configured to encrypt a file decryption key (e.g., the file encryption-decryption key denoted in FIG. 8) to generate an encrypted file decryption key (e.g., the encrypted file encryption-decryption key denoted in FIG. 8) using a first encryption key. As shown in FIG. 8, the authentication device AD is further configured to transfer the encrypted decryption key (e.g., the encrypted file encryption-decryption key denoted in FIG. 8) to the host terminal device HT, and the host terminal device HT is configured to transfer the encrypted decryption key to the server SV. In the path of transferring information from the authentication device AD to the server SV, no unencrypted information is transferred.

Optionally, the file encryption key used by the authentication device AD to encrypt the file and the file decryption key encrypted by the first encryption key is a same key, e.g., the file encryption-decryption key denoted in FIG. 8.

In some embodiments, the file encryption-decryption key is uniquely generated for a respective participant of a conference. Optionally, for each participant, the authentication device AD is configured to generate a different file encryption-decryption key.

In some embodiments, the server SV is configured to store the encrypted file and the encrypted file encryption-decryption key. No unencrypted information is stored on the server SV.

In some embodiments, the client terminal device CT is configured to request downloading the encrypted file and the encrypted file encryption-decryption key from the server SV. The server SV, upon receiving the request from the client terminal device CT, is configured to transfer the encrypted file and the encrypted file encryption-decryption key to the client terminal device CT. The client terminal device CT is configured to decrypt the encrypted file encryption-decryption key using the first decryption key to generate the file encryption-decryption key. Optionally, the client terminal device CT is configured to decrypt the encrypted file encryption-decryption key using a symmetric encryption algorithm.

In one example, the first encryption key and the first decryption key are a same key, e.g., a first encryption-decryption key. The first encryption-decryption key is different from the encryption-decryption key denoted in FIG. 8.

In some embodiments, the client terminal device CT is further configured to decrypt the encrypted file using the encryption-decryption key, thereby obtaining the file.

In the path of transferring information from the server SV to the client terminal device CT, no unencrypted information is transferred.

Figure 9:
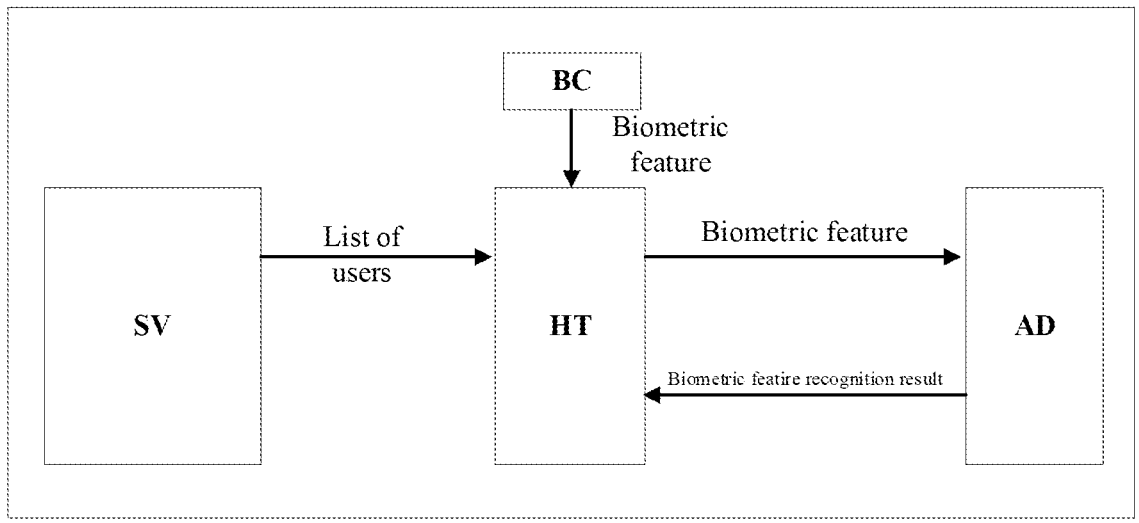
FIG. 9 illustrates a network communication system in some embodiments according to the present disclosure.

FIG. 9 illustrates a network communication system in some embodiments according to the present disclosure. Referring to FIG. 9, the network communication system in some embodiments includes a host terminal device HT, a biometric feature collector BC, a server SV, and an authentication device AD. The biometric feature collector BC is configured to collect biometric feature data of a user (e.g., a conference participant). The biometric feature collector BC is configured to transmit the biometric feature data of the user to the host terminal device HT. Various appropriate biometric features may be used in the present disclosure. Examples of appropriate biometric features include a facial image of the user, a fingerprint of the user, a voiceprint of the user, a retina print of the user, and a palm print of the user. Examples of biometric feature collectors include a camera.

The host terminal device HT is configured to transfer biometric feature of the user to the authentication device AD. The authentication device AD is configured to perform biometric feature recognition upon receiving the biometric feature of the user. Upon completion of the biometric feature recognition, the authentication device AD is configured to transfer biometric feature recognition result to the host terminal device HT.

The server SV is configured to transmit a list of users (e.g., a list of conference participants) to the host terminal device HT.

The host terminal device HT is configured to compare the biometric feature recognition result (e.g., a recognized user) with the list of users. If the recognized user matches with a user in the list of users, the host terminal device HT validates that the recognized user is an intended participant of the conference. The recognized user is permitted to join a conference.

Figure 10:
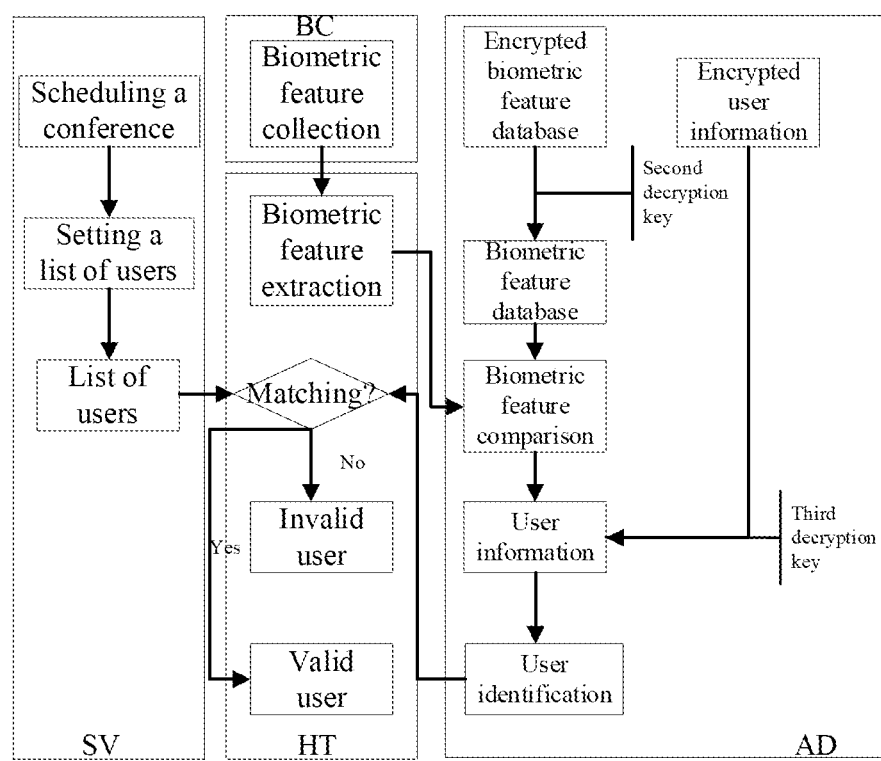
FIG. 10 illustrates a user validation process using a network communication system in some embodiments according to the present disclosure.

FIG. 10 illustrates a user validation process using a network communication system in some embodiments according to the present disclosure. Referring to FIG. 9 and FIG. 10, the server SV in some embodiments is configured to set a list of users. In one example, the network communication system is configured as a conference management system. The server SV is configured to schedule a conference, and set a list of users (e.g., a list of conference participants). For example, the users may register for the conference, and provide their identity information to be saved on the server SV. Once a list of users is set, the server SV is configured to transmit the list of users to the host terminal device HT. Various appropriate protocols may be used for transmitting the list of users. In one example, the server SV is configured to transmit the list of users to the host terminal device HT via a MQTT protocol.

In some embodiments, upon receiving the list of users from the server SV, the host terminal device HT is configured to store the list of users. The list of users includes information of the users (e.g., the conference participants), for example, names and/or other identification information of the users.

Referring to FIG. 9 and FIG. 10, the biometric feature collector BC in some embodiments is configured to collect biometric feature data of a user. For example, the biometric feature collector BC in some embodiments includes a camera configured to capture a facial image of the user. The biometric feature collector BC is configured to transmit the biometric feature data of the user (e.g., the facial image) to the host terminal device HT.

In some embodiments, the host terminal device HT is configured to extract biometric feature from the biometric feature data transmitted from the biometric feature collector BC ("Biometric feature extraction"). In one example, the biometric feature extracted from the biometric feature data is facial feature of the user. The host terminal device HT is then configured to transmit the biometric feature to the authentication device AD.

Referring to FIG. 9 and FIG. 10, the authentication device AD in some embodiments is configured to store an encrypted biometric feature database. In some embodiments, the encrypted biometric feature database is a database including encrypted biometric features of a plurality of users. For example, the encrypted biometric feature database may include encrypted facial features of the plurality of users. In some embodiments, the authentication device AD is further configured to store encrypted user information. For example, the encrypted user information includes encrypted user identification information of the plurality of users such as encrypted user names and/or encrypted user identification numbers of the plurality of users. In the present disclosure, sensitive information such as biometric features and user identification information of the plurality of users are stored in the authentication device AD in an encrypted form, rather than stored in the cloud. Security of the sensitive information can be maintained.

In some embodiments, the authentication device AD is further configured to decrypt the encrypted biometric features of the plurality of users stored in the encrypted biometric feature database, to generate a biometric feature database including unencrypted biometric features of the plurality of users. Optionally, the authentication device AD is configured to decrypt the encrypted biometric features of the plurality of users stored in the encrypted biometric feature database using a second decryption key. Optionally, the authentication device AD is configured to decrypt the encrypted biometric features using a symmetric encryption algorithm.

In some embodiments, the authentication device AD is further configured to decrypt the encrypted user information, to generate user information. Optionally, the authentication device AD is configured to decrypt the encrypted user information using a third decryption key. Optionally, the authentication device AD is configured to decrypt the encrypted biometric features using a symmetric encryption algorithm.

Optionally, the second decryption key and the third decryption key are a same key.

In some embodiments, the authentication device AD is further configured to perform biometric feature recognition. In some embodiments, to perform the biometric feature recognition, the authentication device AD is configured to compare the biometric feature extracted by the host terminal device HT and transmitted to the authentication device AD with the biometric features of the plurality of users unencrypted by the authentication device AD.

In some embodiments, based on a result of the biometric feature recognition, identity of the user may be determined using the user information unencrypted by the authentication device AD ("User identification"). Upon determining the identity of the user, the authentication device AD is configured to transmit the identity of the user to the host terminal device HT.

In some embodiments, upon receiving the identity of the user from the authentication device AD, the host terminal device HT is configured to compare the identity of the user with identities of users in the list of users transmitted from the server SV to the host terminal device HT. When no match is found in the list of users, the user is determined to be an invalid user. For example, the user is determined to be one who is not a participant in the conference, and will be denied access to the conference. In another example, the host terminal device HT is configured to provide a message notifying that the user is not authorized to participate in the conference.

When the identity of the user matches with one of the identities of users in the list of users, the user is deemed a valid user. For example, the user is granted access to the conference.

Figure 11:
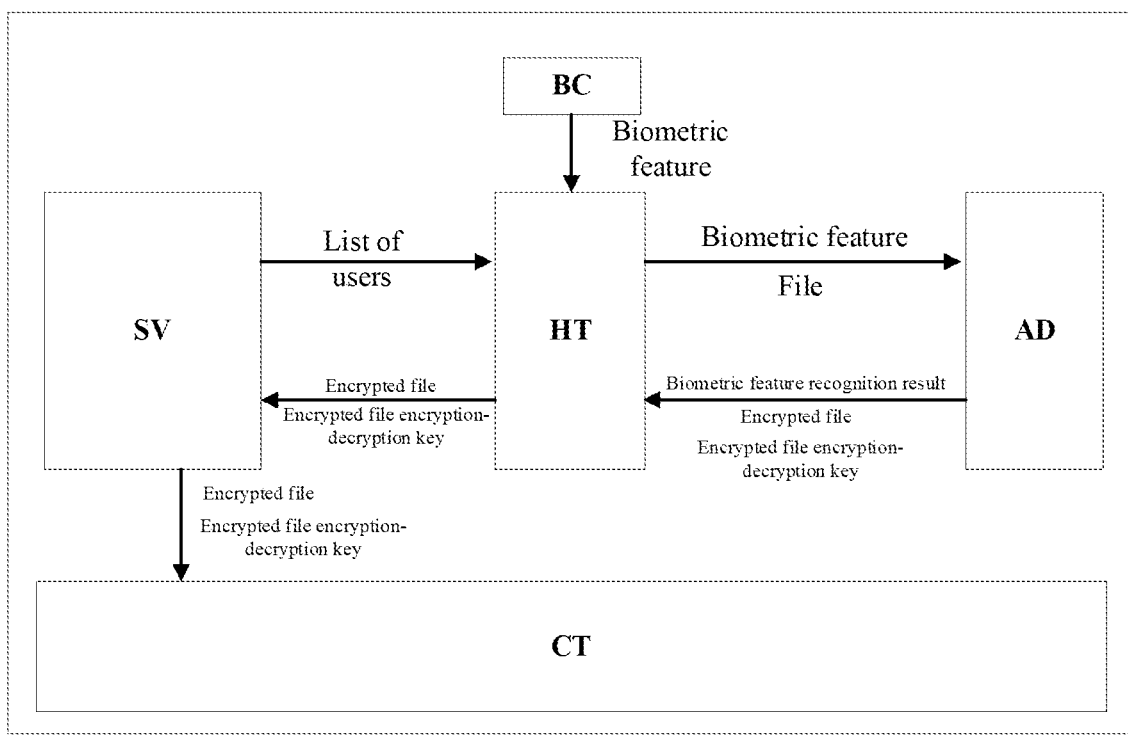
FIG. 11 illustrates a network communication system in some embodiments according to the present disclosure.

FIG. 11 illustrates a network communication system in some embodiments according to the present disclosure. FIG. 11 incorporates portions of the network communication system depicted in FIG. 7 and FIG. 9.

Figure 12:
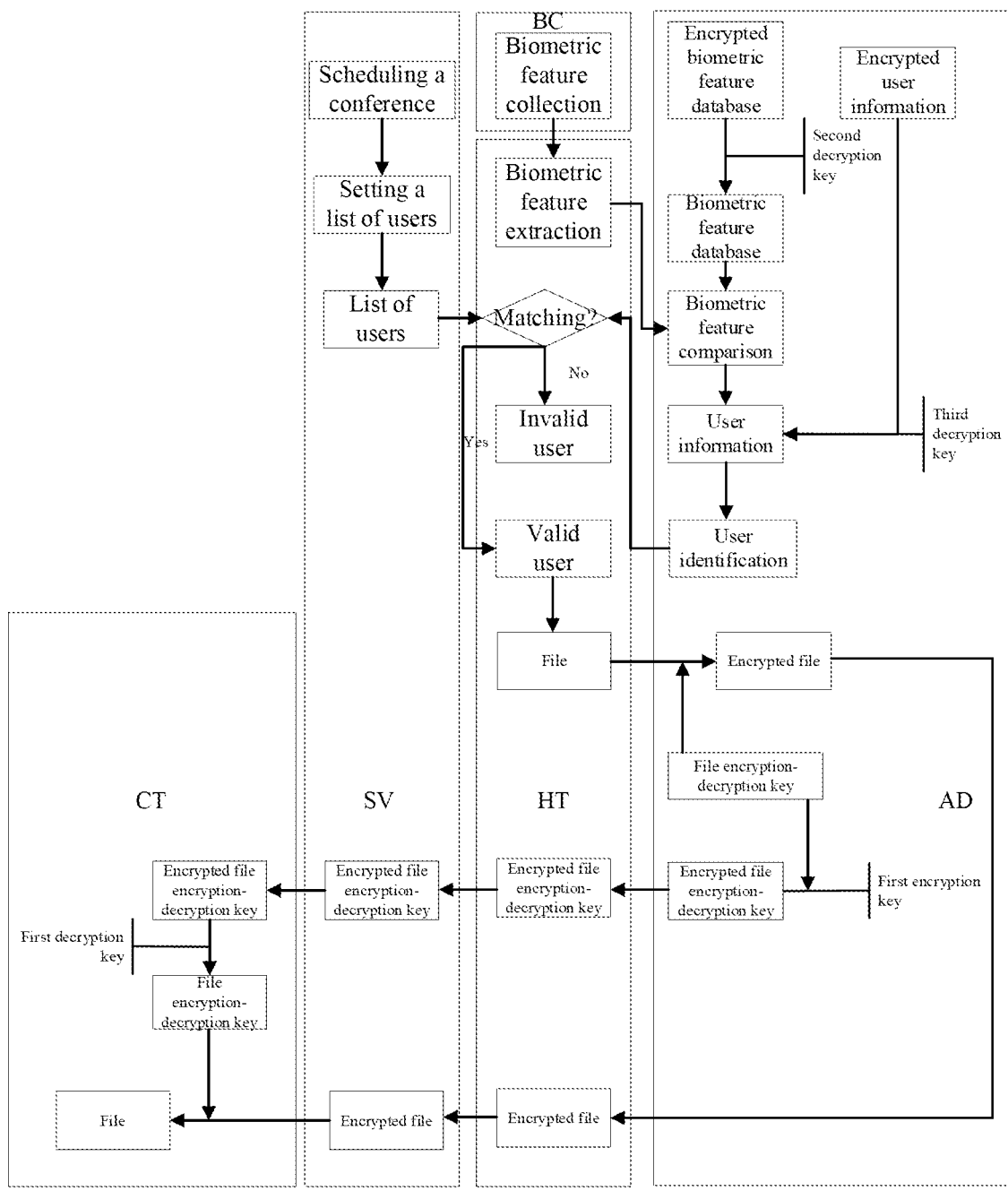
FIG. 12 a detailed process of user validation and file transfer in a network communication system in some embodiments according to the present disclosure.

FIG. 12 a detailed process of user validation and file transfer in a network communication system in some embodiments according to the present disclosure. FIG. 12 incorporate the processes depicted in FIG. 8 and FIG. 10.

Figure 13:
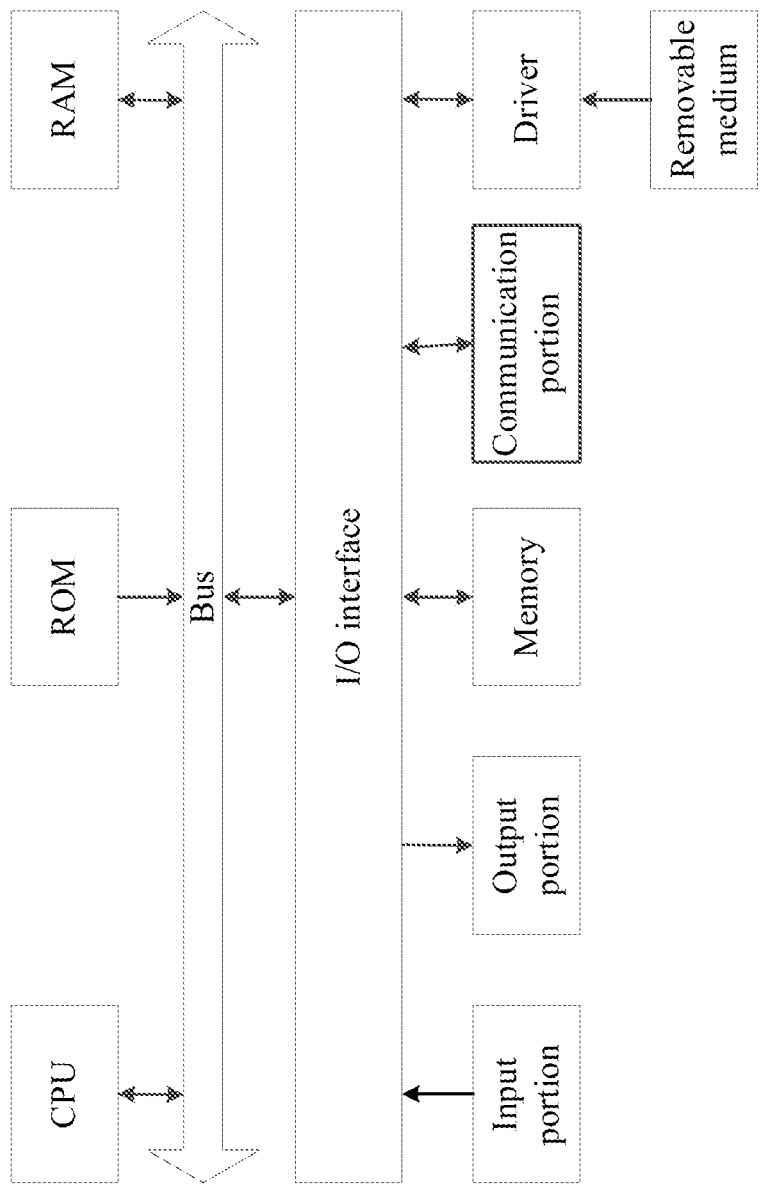
FIG. 13 is a schematic diagram of a structure of a network communication system in some embodiments according to the present disclosure.

FIG. 13 is a schematic diagram of a structure of a network communication system in some embodiments according to the present disclosure. Referring to FIG. 13, in some embodiments, the network communication system includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

Figure 14:
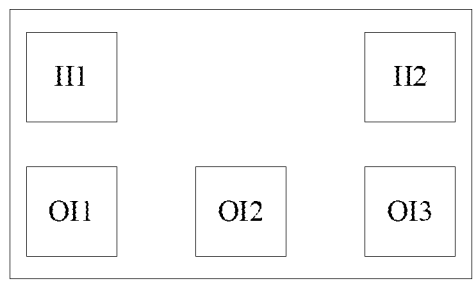

In some embodiments, the network communication system further includes one or more user interfaces. FIG. 14 is a schematic diagram illustrating one or more interfaces in some embodiments according to the present disclosure. Referring to FIG. 14, the one or more user interfaces in some embodiments includes a first input interface II1, a second input interface II2, a first output interface OI1, a second output interface OI2, and a third output interface OI3.

In some embodiments, the one or more user interfaces includes a first input interface II1 configured to receive user input on whether or not an encrypted file transfer is requested for transfer a first file from the client terminal device to the host terminal device.

In some embodiments, the one or more user interfaces further includes a first output interface OI1 configured to display a first two-dimensional bar code allowing a user to scan the first two-dimensional bar code.

In some embodiments, the one or more user interfaces further includes a second input interface II2 configured to receive user input on whether or not an encrypted file transfer is requested for transfer a second file from the server to the client terminal device.

In some embodiments, the one or more user interfaces further includes a second output interface OI2 configured to display a second two-dimensional bar code allowing a user to scan the first two-dimensional bar code.

In some embodiments, the one or more user interfaces further includes a third output interface OI3 configured to provide a message notifying that the user is not authorized to participate in the conference, upon determination no match is found between an identity of a user received from an authentication device and identities of users in a list of users transmitted from a server to a host terminal device.

In another aspect, the present disclosure provides a network communication method. In some embodiments, the network communication method includes connecting a host terminal device to a server through a network; connecting a client terminal device to the server through a network; transferring, directly or indirectly, an encrypted file from the host terminal device to the server; storing the encrypted file on the server; and transmitting the encrypted file from the server to the client terminal device.

In some embodiments, the network communication method further includes transferring a file from the host terminal device to an authentication device; encrypting the file by the authentication device to generate an encrypted file; transferring the encrypted file from the authentication device to the host terminal device; and transferring the encrypted file from the host terminal device to the server. Optionally, the network communication method further includes transferring a decryption key from the authentication device to the host terminal device, and transferring the decryption key from the host terminal device to the server.

In some embodiments, the network communication method includes transferring a first file from the client terminal device to the host terminal device. Optionally, the client terminal device is connected to the host terminal device through a Local Area Network.

In some embodiments, transferring the first file from the client terminal device to the host terminal device includes receiving, by the host terminal device, a user input on whether or not an encrypted file transfer is requested, and generating, by the host terminal device, a two-dimensional bar code. Optionally, the network communication method further includes parsing, by the client terminal device, the two-dimensional bar code; and obtaining a uniform resource locator and optionally an encryption key by the client terminal device. Optionally, the network communication method further includes encrypting the first file and transferring an encrypted first file from the client terminal device to the host terminal device using the uniform resource locator. Optionally, the network communication method further includes, upon receiving the encrypted first file transferred from the client terminal device, decrypting the encrypted first file by the host terminal device, allowing user access. Optionally, the network communication method further includes saving the encrypted first file on the host terminal device.

In some embodiments, the network communication method further includes generating, by the host terminal device, a first two-dimensional bar code. In some embodiments, the network communication method further includes receiving, by the host terminal device, a user input on whether or not an encrypted file transfer is requested. Depending on the user input on whether or not the encrypted file transfer is requested, different types of first two-dimensional bar codes are generated by the host terminal device.

In some embodiments, the first two-dimensional bar code includes a first component C1, a second component C2, and a third component C3. The first component C1 indicates whether an encrypted file transfer is requested. In one example, the first component C1 has a bit width of one bit. In another example, a value 0 for the first component C1 indicates that the encrypted file transfer is not requested. In another example, a value 1 for the first component C1 indicates that the encrypted file transfer is requested.

In some embodiments, the second component C2 includes an encryption key (e.g., a secondary encryption key). Optionally, when the encrypted file transfer is not requested, the second component C2 has invalid bits, indicating that a non-encrypted file transfer is requested. Optionally, when the encrypted file transfer is requested, the second component C2 includes an encryption key (e.g., a secondary encryption key). In one example, the second component C2 has a bit width of 128 bits. In another example, when the first component C1 has a value of 0, the second component C2 has 128 bits of 0, indicating that a non-encrypted file transfer is requested. In another example, when the first component C1 has a value of 1, the second component C2 includes an encryption key of 128 bits (e.g., a secondary encryption key of 128 bits).

In some embodiments, prior to generating the first two-dimensional bar code, the network communication method further includes generating, by the host terminal device, an encryption-decryption key (e.g., denoted as K0). Optionally, generating the encryption-decryption key includes generating the encryption-decryption key by a secure cryptoprocessor. Optionally, the network communication method further includes generating, by the host terminal device, a secondary encryption key (e.g., denoted as K1) using a secondary encryption key generating algorithm (e.g., a self-defined algorithm). Various appropriate secondary encryption key generating algorithms may be used for generating the secondary encryption key from the encryption-decryption key. In one example, the secondary encryption key is generated from the encryption-decryption key by a bit operation. In another example, the bit operation is a circular shift N bits operation, N being a positive integer equal to or great than 1. In another example, the bit operation is a circular shift left N bits operation. In another example, the bit operation is a circular shift right N bits operation.

In some embodiments, the third component C3 includes a first uniform resource locator (URL) for transferring the first file.

In some embodiments, upon scanning the first two-dimensional bar code by the client terminal device, the network communication method further includes parsing, by the client terminal device, the first two-dimensional bar code. In some embodiments, the network communication method further includes obtaining, by the client terminal device, the encryption key by parsing the first two-dimensional bar code. Optionally, the network communication method further includes obtaining, by the client terminal device, a secondary encryption key by parsing the first two-dimensional bar code. Optionally, the network communication method further includes generating, by the client terminal device, an encryption-decryption key using an encryption-decryption key generating algorithm. The encryption-decryption key generating algorithm in some embodiments includes an inverse operation of the secondary encryption key generating algorithm. For example, when the bit operation for the secondary encryption key generating algorithm is a circular shift left N bits operation, a bit operation for the encryption-decryption key generating algorithm is a circular shift right N bits operation.

In some embodiments, the network communication method further includes obtaining, by the client terminal device, the first component C1 of the first two-dimensional bar code by parsing the first two-dimensional bar code.

In some embodiments, the network communication method further includes obtaining, by the client terminal device, the first uniform resource locator for transferring the first file by parsing the first two-dimensional bar code.

In some embodiments, the network communication method further includes transferring, by the client terminal device, the first file to the host terminal device using the first uniform resource locator. Optionally, when a value (e.g., a value of 0) for the first component C1 indicates that the encrypted file transfer is not requested, the network communication method includes transferring, by the client terminal device, the first file to the host terminal device using the first uniform resource locator directly without encryption. Optionally, when a value (e.g., a value of 1) for the first component C1 indicates that the encrypted file transfer is requested, the network communication method includes encrypting, by the client terminal device, the first file using an encryption key to obtain an encrypted first file, and transferring, by the client terminal device, the encrypted first file to the host terminal device using the first uniform resource locator. Optionally, the network communication method includes encrypting, by the client terminal device, the first file using the encryption-decryption key discussed above. Further, the encryption may be performed using various appropriate algorithms. In one example, the encryption may be performed using a symmetric advanced encryption standard algorithm, e.g., with a key size of 128 bits (AES-128).

In some embodiments, the network communication method further includes receiving, by the host terminal device, the first file (not encrypted) or the encrypted first file from the client terminal device. In some embodiments, the network communication method further includes determining, by the host terminal device, whether a received file is encrypted. Upon determination the received file is encrypted, the network communication method further includes decrypting, by the host terminal device, the received file using a decryption key, e.g., the encryption-decryption key discussed above. Once the received file is decrypted, a user may access the decrypted file. In some embodiments, the network communication method further includes saving the file on the host terminal device, e.g., in an encrypted form.

In some embodiments, the network communication method includes generating, by the host terminal device, a second two-dimensional bar code. In some embodiments, the network communication method further includes receiving, by the host terminal device, a user input (e.g., transmitted from the client terminal device and received by the host terminal device) on whether or not an encrypted file transfer is requested. Depending on the user input on whether or not the encrypted file transfer is requested, the network communication method includes generating different types of second two-dimensional bar codes by the host terminal device.

In some embodiments, the second two-dimensional bar code includes a first component C1, a second component C2, and a third component C3. The first component C1 indicates whether an encrypted file transfer is requested. In one example, the first component C1 has a bit width of one bit. In another example, a value 0 for the first component C1 indicates that the encrypted file transfer is not requested. In another example, a value 1 for the first component C1 indicates that the encrypted file transfer is requested.

In some embodiments, the second component C2 includes an encryption key (e.g., a secondary encryption key). Optionally, when the encrypted file transfer is not requested, the second component C2 has invalid bits, indicating that a non-encrypted file transfer is requested. Optionally, when the encrypted file transfer is requested, the second component C2 includes an encryption key (e.g., a secondary encryption key). In one example, the second component C2 has a bit width of 128 bits. In another example, when the first component C1 has a value of 0, the second component C2 has 128 bits of 0, indicating that a non-encrypted file transfer is requested. In another example, when the first component C1 has a value of 1, the second component C2 includes an encryption key of 128 bits (e.g., a secondary encryption key of 128 bits).

In some embodiments, prior to generating the second two-dimensional bar code, the network communication method further includes generating, by the host terminal device, an encryption-decryption key (e.g., denoted as K0). Optionally, the network communication method includes generating the encryption-decryption key by a secure cryptoprocessor. Optionally, the network communication method includes generating, by the host terminal device, a secondary encryption key (e.g., denoted as K1) using a secondary encryption key generating algorithm (e.g., a self-defined algorithm). Various appropriate secondary encryption key generating algorithms may be used for generating the secondary encryption key from the encryption-decryption key. In one example, the secondary encryption key is generated from the encryption-decryption key by a bit operation. In another example, the bit operation is a circular shift N bits operation, N being a positive integer equal to or great than 1. In another example, the bit operation is a circular shift left N bits operation. In another example, the bit operation is a circular shift right N bits operation In some embodiments, the third component C3 includes a second uniform resource locator for downloading the second file or the encrypted second file.

In some embodiments, the network communication method further includes transferring, by the client terminal device, the encrypted second file to the server, and saving the encrypted second file on the server.

In some embodiments, upon obtaining the second two-dimensional bar code by the client terminal device from the host terminal device, the network communication method further includes parsing, by the client terminal device, the second two-dimensional bar code. In some embodiments, the network communication method includes obtaining, by the client terminal device, the decryption key by parsing the second two-dimensional bar code. Optionally, the network communication method includes obtaining, by the client terminal device, a decryption key by parsing the second two-dimensional bar code. Optionally, the network communication method includes generating, by the client terminal device, an encryption-decryption key using an encryption-decryption key generating algorithm. The encryption-decryption key generating algorithm in some embodiments includes an inverse operation of the secondary encryption key generating algorithm. For example, when the bit operation for the secondary encryption key generating algorithm is a circular shift left N bits operation, a bit operation for the encryption-decryption key generating algorithm is a circular shift right N bits operation.

In some embodiments, the network communication method includes obtaining, by the client terminal device, the first component C1 of the second two-dimensional bar code by parsing the second two-dimensional bar code.

In some embodiments, the network communication method includes obtaining, by the client terminal device, the second uniform resource locator for downloading the second file or the encrypted second file by parsing the second two-dimensional bar code.

In some embodiments, the network communication method includes downloading, by the client terminal device, the second file or the encrypted second file from the server using the second uniform resource locator. Optionally, when a value (e.g., a value of 0) for the first component C1 indicates that the encrypted file transfer is not requested, the network communication method includes transferring, by the server, the second file to the client terminal device using the second uniform resource locator directly without encryption. Optionally, when a value (e.g., a value of 1) for the first component C1 indicates that the encrypted file transfer is requested, the network communication method includes transferring, by the server, the encrypted second file to the client terminal device. Optionally, the network communication method includes decrypting, by the client terminal device, the encrypted second file using the encryption-decryption key discussed above. The decryption may be performed using various appropriate algorithms. In one example, the decryption may be performed using a symmetric advanced encryption standard algorithm, e.g., with a key size of 128 bits (AES-128).

In some embodiments, the network communication method includes transferring, by the host terminal device, a file (e.g., an unencrypted conference document) to the authentication device, and encrypting, by the authentication device, the file to generate an encrypted file. In some embodiments, the network communication method further includes generating, by the authentication device, a file decryption key (e.g., an encrypted file encryption-decryption key). Optionally, the network communication method further includes transferring, by the authentication device, the encrypted file and the decryption key (e.g., the encrypted file encryption-decryption key) to the host terminal device.

In some embodiments, the network communication method includes transferring, by the host terminal device, the encrypted file and the decryption key (e.g., the encrypted file encryption-decryption key) to the server. Optionally, the network communication method further includes transferring, by the server, the encrypted file and the decryption key (e.g., the encrypted file encryption-decryption key) to the client terminal device.

In some embodiments, the network communication method includes transferring, by the host terminal device, a file to the authentication device. The file transferred by the host terminal device may be a conference file (e.g., a meeting minutes of a conference). The file transferred by the host terminal device may be an unencrypted file.

In some embodiments, the network communication method includes generating, by the authentication device, a file encryption key (e.g., the file encryption-decryption key). Optionally, the network communication method further includes encrypting, by the authentication device, the file transferred by the host terminal device using the file encryption key into an encrypted file. Optionally, the network communication method further includes encrypting, by the authentication device, the file using a symmetric encryption algorithm. Optionally, the network communication method further includes transferring, by the authentication device, the encrypted file to the host terminal device, and transferring, by the host terminal device, the encrypted file to the server.

In some embodiments, the network communication method includes encrypting, by the authentication device, a file decryption key (e.g., the file encryption-decryption key) to generate an encrypted file decryption key (e.g., the encrypted file encryption-decryption key) using a first encryption key. Optionally, the network communication method further includes transferring, by the authentication device, the encrypted decryption key (e.g., the encrypted file encryption-decryption key) to the host terminal device, and transferring, by the host terminal device, the encrypted decryption key to the server.

In some embodiments, the network communication method includes storing, by the server, the encrypted file and the encrypted file encryption-decryption key.

In some embodiments, the network communication method includes requesting, by the client terminal device, downloading the encrypted file and the encrypted file encryption-decryption key from the server. Upon receiving the request from the client terminal device by the server, the network communication method further includes transferring, by the server, the encrypted file and the encrypted file encryption-decryption key to the client terminal device. Optionally, the network communication method further includes decrypting, by the client terminal device, the encrypted file encryption-decryption key using the first decryption key to generate the file encryption-decryption key. Optionally, the network communication method further includes decrypting, by the client terminal device, the encrypted file encryption-decryption key using a symmetric encryption algorithm.

In one example, the first encryption key and the first decryption key are a same key, e.g., a first encryption-decryption key. The first encryption-decryption key is different from the encryption-decryption key denoted in FIG. 8.

In some embodiments, the network communication method further includes decrypting, by the client terminal device, the encrypted file using the encryption-decryption key, thereby obtaining the file.

In some embodiments, the network communication method includes collecting, by the biometric feature collector, biometric feature data of a user (e.g., a conference participant). Optionally, the network communication method further includes transmitting, by the biometric feature collector, the biometric feature data of the user to the host terminal device.

In some embodiments, the network communication method includes transferring, by the host terminal device, biometric feature of the user to the authentication device. Optionally, the network communication method further includes performing, by the authentication device, biometric feature recognition upon receiving the biometric feature of the user. Upon completion of the biometric feature recognition, the network communication method further includes transferring, by the authentication device, biometric feature recognition result to the host terminal device.

In some embodiments, the network communication method includes transmitting, by the server, a list of users (e.g., a list of conference participants) to the host terminal device.

In some embodiments, the network communication method includes comparing, by the host terminal device, the biometric feature recognition result (e.g., a recognized user) with the list of users. If the recognized user matches with a user in the list of users, the recognized user is validated as an intended participant of the conference. The recognized user is permitted to join a conference.

In some embodiments, the network communication method includes setting, by the server, a list of users. In one example, the network communication method is configured as a conference management method. Optionally, the network communication method further includes scheduling, by the server, a conference, and setting a list of users (e.g., a list of conference participants). For example, the users may register for the conference, and provide their identity information to be saved on the server. Once a list of users is set, the network communication method further includes transmitting, by the server, the list of users to the host terminal device.

In some embodiments, upon receiving the list of users by the host terminal device from the server, the network communication method further includes storing, by the host terminal device, the list of users. The list of users includes information of the users (e.g., the conference participants), for example, names and/or other identification information of the users.

In some embodiments, the network communication method includes collecting, by the biometric feature collector, biometric feature data of a user; and transmitting, by the biometric feature collector, the biometric feature data of the user (e.g., the facial image) to the host terminal device.

In some embodiments, the network communication method includes extracting, by the host terminal device, biometric feature from the biometric feature data transmitted from the biometric feature collector ("Biometric feature extraction"). In one example, the biometric feature extracted from the biometric feature data is facial feature of the user. Optionally, the network communication method further includes transmitting, by the host terminal device, the biometric feature to the authentication device.

In some embodiments, the network communication method includes storing, by the authentication device, an encrypted biometric feature database. In some embodiments, the encrypted biometric feature database is a database including encrypted biometric features of a plurality of users. For example, the encrypted biometric feature database may include encrypted facial features of the plurality of users. In some embodiments, the network communication method includes storing, by the authentication device, encrypted user information. For example, the encrypted user information includes encrypted user identification information of the plurality of users such as encrypted user names and/or encrypted user identification numbers of the plurality of users.

In some embodiments, the network communication method includes decrypting, by the authentication device, the encrypted biometric features of the plurality of users stored in the encrypted biometric feature database, and generating a biometric feature database including unencrypted biometric features of the plurality of users. Optionally, the network communication method further includes decrypting, by the authentication device, the encrypted biometric features of the plurality of users stored in the encrypted biometric feature database using a second decryption key. Optionally, the network communication method further includes decrypting, by the authentication device, the encrypted biometric features using a symmetric encryption algorithm.

In some embodiments, the network communication method includes decrypting, by the authentication device, the encrypted user information, and generating user information. Optionally, the network communication method further includes decrypting, by the authentication device, the encrypted user information using a third decryption key. Optionally, the network communication method further includes decrypting, by the authentication device, the encrypted biometric features using a symmetric encryption algorithm.

In some embodiments, the network communication method includes performing, by the authentication device, biometric feature recognition. In some embodiments, to perform the biometric feature recognition, the network communication method further includes comparing, by the authentication device, the biometric feature extracted by the host terminal device and transmitted to the authentication device with the biometric features of the plurality of users unencrypted by the authentication device.

In some embodiments, based on a result of the biometric feature recognition, identity of the user may be determined using the user information unencrypted by the authentication device. Upon determining the identity of the user, the network communication method further includes transmitting, by the authentication device, the identity of the user to the host terminal device.

In some embodiments, upon receiving the identity of the user from the authentication device AD, the network communication method includes comparing, by the host terminal device, the identity of the user with identities of users in the list of users transmitted from the server to the host terminal device. When no match is found in the list of users, the user is determined to be an invalid user. For example, the user is determined to be one who is not a participant in the conference, and will be denied access to the conference. In another example, the network communication method further includes providing, by the host terminal device, a message notifying that the user is not authorized to participate in the conference.

When the identity of the user matches with one of the identities of users in the list of users, the user is deemed a valid user. For example, the user is granted access to the conference.

In some embodiments, the network communication method further includes generating one or more user interfaces. In some embodiments, the one or more user interfaces includes a first input interface, a second input interface, a first output interface, a second output interface, and a third output interface.

In some embodiments, the one or more user interfaces includes a first input interface configured to receive user input on whether or not an encrypted file transfer is requested for transfer a first file from the client terminal device to the host terminal device.

In some embodiments, the one or more user interfaces further includes a first output interface configured to display a first two-dimensional bar code allowing a user to scan the first two-dimensional bar code.

In some embodiments, the one or more user interfaces further includes a second input interface configured to receive user input on whether or not an encrypted file transfer is requested for transfer a second file from the server to the client terminal device.

In some embodiments, the one or more user interfaces further includes a second output interface configured to display a second two-dimensional bar code allowing a user to scan the first two-dimensional bar code.

In some embodiments, the one or more user interfaces further includes a third output interface configured to provide a message notifying that the user is not authorized to participate in the conference, upon determination no match is found between an identity of a user received from an authentication device and identities of users in a list of users transmitted from a server to a host terminal device.

In another aspect, the present disclosure provides a computer-program product comprising a non-transitory tangible computer-readable medium having computer-readable instructions thereon. In some embodiments, the computer-readable instructions being executable by a processor to cause the processor to perform connecting a host terminal device to a server through a network; connecting a client terminal device to the server through a network; transferring, directly or indirectly, an encrypted file from the host terminal device to the server; storing the encrypted file on the server; and transmitting the encrypted file from the server to the client terminal device.

In some embodiments, the computer-readable instructions are executable by a processor to cause the processor to perform causing the host terminal device to generate a first two-dimensional bar code; upon scanning the first two-dimensional bar code, causing the client terminal device to parse the first two-dimensional bar code to obtain a first uniform resource locator; and upon parsing the first two-dimensional bar code, causing the client terminal device to transfer a file to the host terminal device via the first uniform resource locator.

In some embodiments, the computer-readable instructions are executable by a processor to cause the processor to perform causing the client terminal device to parse the first two-dimensional bar code to further obtain a first component of the first two-dimensional bar code. Optionally, a first value of the first component indicates that an encrypted file transfer is not requested. Optionally, a second value of the first component indicates that an encrypted file transfer is requested.

In some embodiments, the computer-readable instructions are executable by a processor to cause the processor to perform causing the client terminal device to parse the first two-dimensional bar code to obtain an encryption key; to encrypt a first file to obtain an encrypted first file; and to transfer the encrypted first file to the host terminal device.

In some embodiments, the computer-readable instructions are executable by a processor to cause the processor to perform, when an encrypted file transfer is requested, causing the client terminal device to parse the first two-dimensional bar code to obtain a secondary encryption key; to generate an encryption-decryption key by applying an encryption-decryption key generating algorithm on the secondary encryption key; and to encrypt the first file using the encryption-decryption key to obtain the encrypted first file.

In some embodiments, the computer-readable instructions are executable by a processor to cause the processor to perform, when an encrypted file transfer is not requested, causing the client terminal device to transfer a first file to the host terminal device without encryption.

In some embodiments, the computer-readable instructions are executable by a processor to cause the processor to perform, when an encrypted file transfer is not requested, causing the client terminal device to transfer a first file to the host terminal device without encryption.

In some embodiments, the computer-readable instructions are executable by a processor to cause the processor to perform causing the host terminal device to receive an encrypted first file from the client terminal device; and to decrypt the encrypted first file using a decryption key.

In some embodiments, the computer-readable instructions are executable by a processor to cause the processor to perform causing the host terminal device to generate a second two-dimensional bar code; upon obtaining the second two-dimensional bar code from the host terminal device, causing the client terminal device to parse the second two-dimensional bar code to obtain a second uniform resource locator; and upon parsing the second two-dimensional bar code, causing the client terminal device to download a file from the server via the second uniform resource locator.

In some embodiments, the computer-readable instructions are executable by a processor to cause the processor to perform causing the client terminal device to parse the first two-dimensional bar code to further obtain a first component of the second two-dimensional bar code. Optionally, a first value of the first component indicates that an encrypted file transfer is not requested. Optionally, a second value of the first component indicates that an encrypted file transfer is requested.

In some embodiments, the computer-readable instructions are executable by a processor to cause the processor to perform causing the client terminal device to download an encrypted second file from the server; to parse the second two-dimensional bar code to obtain a decryption key; and to decrypt the encrypted second file to obtain a second file.

In some embodiments, the computer-readable instructions are executable by a processor to cause the processor to perform, when an encrypted file transfer is requested, causing the client terminal device to generate an encryption-decryption key by applying an encryption-decryption key generating algorithm on the decryption key; and decrypt the encrypted second file using the encryption-decryption key to obtain a second file.

In some embodiments, the computer-readable instructions are executable by a processor to cause the processor to perform causing the host terminal device to transfer a file to an authentication device locally connected to the host terminal device; causing the authentication device to encrypt the file to generate an encrypted file; causing the authentication device to transfer the encrypted file to the host terminal device; causing the host terminal device to transfer the encrypted file to the server; and causing the server to transfer the encrypted file to the client terminal device.

In some embodiments, the computer-readable instructions are executable by a processor to cause the processor to perform causing the authentication device to generate a file encryption key, and to encrypt the file transferred by the host terminal device using the file encryption key into the encrypted file.

In some embodiments, the computer-readable instructions are executable by a processor to cause the processor to perform causing the authentication device to generate a file decryption key; to generate an encrypted file decryption key by encrypting the file decryption key; and to transfer the encrypted file decryption key to the host terminal device. Optionally, the computer-readable instructions are executable by a processor to cause the processor to perform causing the host terminal device to transfer the encrypted file decryption key to the server; and causing the server to transfer the encrypted file decryption key to the client terminal device.

In some embodiments, the computer-readable instructions are executable by a processor to cause the processor to perform causing the client terminal device to obtain the encrypted file and an encrypted file decryption key from the server; decrypt the encrypted file decryption key to generate a file decryption key; and decrypt the encrypted file using the file decryption key to obtain the file.

In some embodiments, the computer-readable instructions are executable by a processor to cause the processor to perform causing the host terminal device to transfer biometric feature of a user to the authentication device; causing the authentication device to perform biometric feature recognition upon receiving the biometric feature of the user; causing the server to transmit a list of users to the host terminal device; and causing the host terminal device to compare the biometric feature recognition result with the list of users. Optionally, the computer-readable instructions are executable by a processor to cause the processor to perform causing a biometric feature collector to transmit the biometric feature data of the user collected from the biometric feature collector to the host terminal device.

In some embodiments, the computer-readable instructions are executable by a processor to cause the processor to perform causing the host terminal device to extract biometric feature from the biometric feature data transmitted from the biometric feature collector. Optionally, the computer-readable instructions are executable by a processor to cause the processor to perform causing the authentication device to store an encrypted biometric feature database including encrypted biometric features of a plurality of users, and configured to store encrypted user information; to decrypt the encrypted biometric features of the plurality of users stored in the encrypted biometric feature database, to generate a biometric feature database including unencrypted biometric features of the plurality of users; to decrypt the encrypted user information, to generate user information; and to compare the biometric feature extracted by the host terminal device and transmitted to the authentication device with the biometric features of the plurality of users unencrypted by the authentication device, thereby determining an identity of the user. Optionally, the computer-readable instructions are executable by a processor to cause the processor to perform causing the host terminal device to compare the identity of the user with identities of users in the list of users transmitted from the server to the host terminal device.

In some embodiments, the computer-readable instructions are executable by a processor to cause the processor to perform generating one or more user interfaces. In some embodiments, the one or more user interfaces includes a first input interface, a second input interface, a first output interface, a second output interface, and a third output interface.

In some embodiments, the one or more user interfaces includes a first input interface configured to receive user input on whether or not an encrypted file transfer is requested for transfer a first file from the client terminal device to the host terminal device.

In some embodiments, the one or more user interfaces further includes a first output interface configured to display a first two-dimensional bar code allowing a user to scan the first two-dimensional bar code.

In some embodiments, the one or more user interfaces further includes a second input interface configured to receive user input on whether or not an encrypted file transfer is requested for transfer a second file from the server to the client terminal device.

In some embodiments, the one or more user interfaces further includes a second output interface configured to display a second two-dimensional bar code allowing a user to scan the first two-dimensional bar code.

In some embodiments, the one or more user interfaces further includes a third output interface configured to provide a message notifying that the user is not authorized to participate in the conference, upon determination no match is found between an identity of a user received from an authentication device and identities of users in a list of users transmitted from a server to a host terminal device.

Various illustrative operations described in connection with the configurations disclosed herein may be implemented as electronic hardware, computer software, or combinations of both. Such operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A network communication system, comprising:
   a server;
   a host terminal device connected to the server through a network; and
   a client terminal device connected to the server through a network;
   wherein the host terminal device is configured to transfer, directly or indirectly, an encrypted file to the server;
   the server is configured to store the encrypted file; and
   the server is configured to transmit the encrypted file to the client terminal device;
   wherein the host terminal device is configured to generate a first two-dimensional bar code;
   upon scanning the first two-dimensional bar code, the client terminal device is configured to parse the first two-dimensional bar code to obtain a first uniform resource locator; and
   upon parsing the first two-dimensional bar code, the client terminal device is configured to transfer a file to the host terminal device via the first uniform resource locator;
   wherein the client terminal device is configured to:
   parse the first two-dimensional bar code to obtain an encryption key;
   encrypt a first file to obtain an encrypted first file; and
   transfer the encrypted first file to the host terminal device.

2. The network communication system of claim 1, wherein the client terminal device is configured to parse the first two-dimensional bar code to further obtain a first component of the first two-dimensional bar code;
   a first value of the first component indicates that an encrypted file transfer is not requested; and
   a second value of the first component indicates that an encrypted file transfer is requested.

3. The network communication system of claim 1, wherein, when an encrypted file transfer is requested, the client terminal device is configured to:
   parse the first two-dimensional bar code to obtain a secondary encryption key;
   generate an encryption-decryption key by applying an encryption-decryption key generating algorithm on the secondary encryption key; and encrypt the first file using the encryption-decryption key to obtain the encrypted first file.

4. The network communication system of claim 1, wherein, when an encrypted file transfer is not requested, the client terminal device is configured to transfer a first file to the host terminal device without encryption.

5. The network communication system of claim 1, wherein the host terminal device is configured to:
receive an encrypted first file from the client terminal device; and
decrypt the encrypted first file using a decryption key.

6. The network communication system of claim 1, wherein the host terminal device is configured to generate a second two-dimensional bar code;
upon obtaining the second two-dimensional bar code from the host terminal device, the client terminal device is configured to parse the second two-dimensional bar code to obtain a second uniform resource locator; and
upon parsing the second two-dimensional bar code, the client terminal device is configured to download a file from the server via the second uniform resource locator.

7. The network communication system of claim 6, wherein the client terminal device is configured to parse the second two-dimensional bar code to further obtain a first component of the second two-dimensional bar code;
a first value of the first component indicates that an encrypted file transfer is not requested; and
a second value of the first component indicates that an encrypted file transfer is requested.

8. The network communication system of claim 6, wherein the client terminal device is configured to:
download an encrypted second file from the server;
parse the second two-dimensional bar code to obtain a decryption key; and
decrypt the encrypted second file to obtain a second file.

9. The network communication system of claim 8, wherein, when an encrypted file transfer is requested, the client terminal device is configured to:
generate an encryption-decryption key by applying an encryption-decryption key generating algorithm on the decryption key; and
decrypt the encrypted second file using the encryption-decryption key to obtain a second file.

10. The network communication system of claim 1, further comprising an authentication device locally connected to the host terminal device;
wherein the host terminal device is configured to transfer a file to the authentication device;
the authentication device is configured to encrypt the file to generate an encrypted file;
the authentication device is further configured to transfer the encrypted file to the host terminal device;
the host terminal device is further configured to transfer the encrypted file to the server; and
the server is configured to transfer the encrypted file to the client terminal device.

11. The network communication system of claim 10, wherein the authentication device is configured to generate a file encryption key, and configured to encrypt the file transferred by the host terminal device using the file encryption key into the encrypted file.

12. The network communication system of claim 10, wherein the authentication device is configured to:
generate a file decryption key;
generate an encrypted file decryption key by encrypting the file decryption key; and
transfer the encrypted file decryption key to the host terminal device;
wherein the host terminal device is further configured to transfer the encrypted file decryption key to the server; and
the server is configured to transfer the encrypted file decryption key to the client terminal device.

13. The network communication system of claim 12, wherein the file decryption key is the same as a file encryption key used by the authentication device to encrypt the file.

14. The network communication system of claim 10, wherein the client terminal device is configured to:
obtain the encrypted file and an encrypted file decryption key from the server;
decrypt the encrypted file decryption key to generate a file decryption key; and
decrypt the encrypted file using the file decryption key to obtain the file.

15. The network communication system of claim 10, further comprising a biometric feature collector configured to:
collect biometric feature data of a user; and
transmit the biometric feature data of the user to the host terminal device;
wherein the host terminal device is configured to transfer biometric feature of the user to the authentication device;
the authentication device is configured to perform biometric feature recognition upon receiving the biometric feature of the user;
the server is configured to transmit a list of users to the host terminal device; and
the host terminal device is configured to compare biometric feature recognition result with the list of users.

16. The network communication system of claim 15, wherein the host terminal device is configured to extract biometric feature from the biometric feature data transmitted from the biometric feature collector;
wherein the authentication device is configured to:
store an encrypted biometric feature database including encrypted biometric features of a plurality of users, and configured to store encrypted user information;
decrypt the encrypted biometric features of the plurality of users stored in the encrypted biometric feature database, to generate a biometric feature database including unencrypted biometric features of the plurality of users;
decrypt the encrypted user information, to generate user information; and
compare the biometric feature extracted by the host terminal device and transmitted to the authentication device with the biometric features of the plurality of users unencrypted by the authentication device, thereby determining an identity of the user;
wherein the host terminal device is configured to compare the identity of the user with identities of users in the list of users transmitted from the server to the host terminal device.

17. A network communication method, comprising:
connecting a host terminal device to a server through a network;
connecting a client terminal device to the server through a network;
transferring, directly or indirectly, an encrypted file from the host terminal device to the server;
storing the encrypted file on the server;

transmitting the encrypted file from the server to the client terminal device;
generating a first two-dimensional bar code by the host terminal device;
upon scanning the first two-dimensional bar code, parsing, by the client terminal device, the first two-dimensional bar code to obtain a first uniform resource locator; and
upon parsing the first two-dimensional bar code, transferring, by the client terminal device, a file to the host terminal device via the first uniform resource locator;
parsing, by the client terminal device, the first two-dimensional bar code to obtain an encryption key;
encrypting, by the client terminal device, a first file to obtain an encrypted first file; and
transferring, by the client terminal device, the encrypted first file to the host terminal device.

18. A computer-product comprising a non-transitory tangible computer-readable medium having computer-readable instructions thereon, the computer-readable instructions being executable by a processor to cause the processor to perform:
connecting a host terminal device to a server through a network;
connecting a client terminal device to the server through a network;
transferring, directly or indirectly, an encrypted file from the host terminal device to the server;
storing the encrypted file on the server;
transmitting the encrypted file from the server to the client terminal device;
generating a first two-dimensional bar code by the host terminal device;
upon scanning the first two-dimensional bar code, parsing, by the client terminal device, the first two-dimensional bar code to obtain a first uniform resource locator; and
upon parsing the first two-dimensional bar code, transferring, by the client terminal device, a file to the host terminal device via the first uniform resource locator;
parsing, by the client terminal device, the first two-dimensional bar code to obtain an encryption key;
encrypting, by the client terminal device, a first file to obtain an encrypted first file; and
transferring, by the client terminal device, the encrypted first file to the host terminal device.

* * * * *